(12) United States Patent
Fukuda et al.

(10) Patent No.: US 10,841,087 B2
(45) Date of Patent: Nov. 17, 2020

(54) SECURITY DEVICE, SYSTEM, AND SECURITY METHOD

(71) Applicant: Mitsubishi Electric Corporation, Tokyo (JP)

(72) Inventors: Hisashi Fukuda, Tokyo (JP); Takeshi Yoneda, Tokyo (JP); Nobuhiro Kobayashi, Tokyo (JP); Daisuke Suzuki, Tokyo (JP); Manabu Misawa, Tokyo (JP); Koichi Shimizu, Tokyo (JP); Takeshi Sugawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 71 days.

(21) Appl. No.: 15/761,318

(22) PCT Filed: Nov. 5, 2015

(86) PCT No.: PCT/JP2015/081111
§ 371 (c)(1),
(2) Date: Mar. 19, 2018

(87) PCT Pub. No.: WO2017/077611
PCT Pub. Date: May 11, 2017

(65) Prior Publication Data
US 2018/0248690 A1    Aug. 30, 2018

(51) Int. Cl.
*H04L 9/08*    (2006.01)
*H04L 9/10*    (2006.01)
(Continued)

(52) U.S. Cl.
CPC ............ *H04L 9/0866* (2013.01); *G06F 21/60* (2013.01); *H04L 9/08* (2013.01); *H04L 9/0825* (2013.01);
(Continued)

(58) Field of Classification Search
CPC ..... H04L 9/0866; H04L 9/3278; H04L 63/12; H04L 9/08; H04L 9/0825; H04L 9/0894;
(Continued)

(56) References Cited

U.S. PATENT DOCUMENTS

| | | | |
|---|---|---|---|
| 10,136,257 B2 * | 11/2018 | Laursen | ................ H04W 4/029 |
| 2009/0208003 A1 * | 8/2009 | Matsukawa | ............. H04L 9/083 380/44 |

(Continued)

FOREIGN PATENT DOCUMENTS

| | | | |
|---|---|---|---|
| CN | 101847296 A | 9/2010 | |
| CN | 102473230 A | 5/2012 | |

(Continued)

OTHER PUBLICATIONS

Petit, J. • Bosch, C. • Feiri, M. • Kargl, F.; On the potential of PUF for pseudonym generation in vehicular networks; 2012 IEEE Vehicular Networking Conference (VNC) (pp. 94-100); (Year: 2012).*

(Continued)

*Primary Examiner* — Luu T Pham
*Assistant Examiner* — Chao Wang
(74) *Attorney, Agent, or Firm* — Birch, Stewart, Kolasch & Birch, LLP.

(57) ABSTRACT

The present invention relates to a security device which performs processes such as authentication or cryptography, for example a security device for securely holding a key used in a cryptographic process, and a security method therefore.
The security device includes: an identifier generation unit to generate an identifier specific to the security device by using a PUF; a PUF key generation unit to generate a PUF key specific to the security device by using the identifier; a reception unit to receive a registration command in which the registration key and a signature generated for the regis- (Continued)

tration key by using a secret key corresponding to the public key are contained; a signature verification unit to verify, using the public key, validity of the signature contained in the registration command received by the reception unit and output the verification result indicating either failure or success in the verification; and a command execution unit to reject execution of the registration command in a case where the verification result outputted from the signature verification unit is failure, and to encrypt the registration key of the registration command with the PUF key and then store the encrypted registration key in the registration key storage unit in a case where the verification result is success.

4 Claims, 12 Drawing Sheets

(51) Int. Cl.
*G06F 21/60* (2013.01)
*H04L 9/32* (2006.01)
*H04L 29/06* (2006.01)

(52) U.S. Cl.
CPC ............. *H04L 9/0894* (2013.01); *H04L 9/10* (2013.01); *H04L 9/3247* (2013.01); *H04L 9/3278* (2013.01); *H04L 63/12* (2013.01)

(58) Field of Classification Search
CPC ....... H04L 9/10; H04L 9/3234; H04L 9/3242; H04L 9/3247
See application file for complete search history.

(56) References Cited

U.S. PATENT DOCUMENTS

| | | | |
|---|---|---|---|
| 2009/0260064 A1* | 10/2009 | McDowell | G06F 21/10 726/4 |
| 2010/0250936 A1 | 9/2010 | Kusakawa et al. | |
| 2011/0002461 A1* | 1/2011 | Erhart | H04L 9/302 380/44 |
| 2011/0299679 A1 | 12/2011 | Yamaguchi et al. | |
| 2012/0324310 A1* | 12/2012 | Oshida | H04L 9/3278 714/755 |
| 2014/0089685 A1* | 3/2014 | Suzuki | H04L 9/3278 713/193 |
| 2014/0093074 A1* | 4/2014 | Gotze | H04L 9/0866 380/45 |
| 2014/0189890 A1* | 7/2014 | Koeberl | H04L 9/0866 726/34 |
| 2015/0098268 A1* | 4/2015 | Yabuuchi | G11C 11/419 365/154 |
| 2015/0188707 A1* | 7/2015 | Gehrer | H04L 9/14 380/30 |
| 2015/0318994 A1* | 11/2015 | Walsh | H04L 9/3236 713/182 |
| 2017/0310489 A1* | 10/2017 | Van Der Sluis | G09C 1/00 |

FOREIGN PATENT DOCUMENTS

| | | |
|---|---|---|
| CN | 102843234 A | 12/2012 |
| JP | 2002-304610 A | 10/2002 |
| JP | 2010-226603 A | 10/2010 |
| WO | WO 2012/164721 A1 | 12/2012 |

OTHER PUBLICATIONS

Anju P. Johnson • Rajat Subhra Chakraborty • Debdeep Mukhopadhyay; A PUF-Enabled Secure Architecture for FPGA-Based IoT Applications; IEEE Transactions on Multi-Scale Computing Systems (vol. 1, Issue: 2, pp. 110-122) (Year: 2015).*

Shlomi Dolev • Lukasz Krzywiecki • Nisha Panwar • Michael Segal; Optical PUF for Non Forwardable Vehicle Authentication; 2015 IEEE 14th International Symposium on Network Computing and Applications (pp. 204-207) (Year: 2015).*

Renesas Electronics, "RX71M Group User's Manual: Hardware," Renesas 32-Bit MCU, RX Family / RX700 Series, Jan. 2015, pp. 1-2923.

Office Action dated Jan. 15, 2020 in corresponding European Application No. 15 907 797.3.

Office Action dated Aug. 24, 2020 in correspondng Chinese Application No. 201580084173.9.

* cited by examiner

Fig. 8

| Command ID | Key identifier w | Signature Sig (Kmp, Krs) | Apparatus-manufacturer's public key Kmp | /80 |

| Command ID | Key identifier w' | Signature Sig (Km, Kms) | Registration key Km | /81 |

SECURITY DEVICE, SYSTEM, AND SECURITY METHOD

TECHNICAL FIELD

The present invention relates to a security device executing processes such as authentication or cryptography, for example a security device for securely holding a key used in a cryptographic process, and a security method therefor.

BACKGROUND ART

In recent years, as an embedded apparatus typified by mobile phones is increasingly networked, the embedded apparatus increasingly needs to perform processes involved with information security in order to keep data treated by the embedded apparatus secret and maintain the integrity of the data, as well as to authenticate the embedded apparatus. A process involved with information security is realized by an encryption algorithm or an authentication algorithm It is necessary to securely hold keys necessary for executing the algorithms. As a method for securely holding the key, there is a technique called a physical unclonable function (PUF). The PUF generates specific values for individual devices on the basis of their manufacturing variations and the specific values are utilized for encrypting keys to store in memory. This can prevent information leakage due to unauthorized memory readout. In Patent Document 1, key protection is realized by utilizing the PUF characteristic described above.

Patent Document 1 is described under a premise that a key to be registered in a device is preregistered in the device. In reality, however, it is first necessary to register a key to be registered in the device. If the device trusts and registers all the keys provided for registration, it means that an attacker also can freely register keys in the device. Therefore, it is necessary that a privileged command such as a key registration is access-controlled. However, Patent Document 1 discloses nothing about access control in providing a key to a device.

On the other hand, Non-Patent Document 1 being one of manuals for an embedded device describes that an access control method is adopted for the device. According to the access control method, the ID of a debugging device authorized to use privileged commands is registered in advance in the embedded device and is compared with the ID of a device requesting connection to perform access control.

Also, in some cases, a personal identification number called PIN is used as a device access control method.

PRIOR ART DOCUMENTS

Patent Document

Patent Document 1: Japanese Patent Laid-Open Publication No. 2010-226603

Non-Patent Document

Non-Patent Document 1: RX71M Group User's Manual: Hardware, Rev. 1.00, January 2015, Renesas Electronics

SUMMARY OF THE INVENTION

Problems to be Solved by the Invention

In the case as shown in Patent Document 1 where the PUF is used to protect a key, the key is encrypted using a value specific to the device which is obtained from the PUF. At this moment, in order to prevent information leakage through unauthorized memory readout, the value specific to the device used for key encryption is not stored in its memory. The specific value is temporarily used for key encryption, and then destroyed. Therefore, under the premise that a value specific to a device is not stored in its memory, in order to realize access control, it is not allowed to adopt a method in which a device's ID, namely a value specific to the device, is registered in its memory as shown in Non-Patent Document 1, or a method in which a PIN is stored in its memory. As described above, in the case when the device's ID registered in the memory is stolen through the device destruction or the like, a conventional technique disclosed in Patent Document 1 or Non-Patent Document 1 has a problem that the legitimate debugging device may be impersonated.

The present invention is made to solve the problem described above and to realize, without storing a device's ID or a PIN in a memory, access control for privileged commands such as a key registration.

Means for Solving Problem

In order to solve the problem described above, a security device according to the present invention includes: a public key storage which is a non-rewritable memory to store a first public key; an identifier generator to generate an identifier specific to the security device by using a PUF (physical unclonable function); a PUF key generator to generate a PUF key specific to the security device by using the identifier; a registration key storage to store a registration key; a receiver to receive a registration command in which the registration key and a signature generated for the registration key by using a secret key corresponding to the first public key are contained; a signature verifier to verify, using the first public key, validity of the signature contained in the registration command received by the receiver and output the verification result indicating either failure or success in the verification; and a command executor to reject execution of the registration command in a case where the verification result outputted from the signature verifier is failure, and to encrypt the registration key of the registration command with the PUF key and then store the encrypted registration key in the registration key storage in a case where the verification result is success.

Effect of the Invention

According to the present invention, a signature is given to a privileged command such as a key registration, and then the signature is then verified. This brings an effect that without storing the device's ID or a PIN in a memory, a third party's unauthorized readout can be prevented and access control for the privileged command can be realized.

BRIEF DESCRIPTION OF THE DRAWINGS

FIG. 8 shows data formats for an apparatus manufacturer's public-key registration request 80 and the apparatus manufacturer's secret-information registration request 81, which both are examples of commands;

EMBODIMENTS FOR CARRYING OUT THE INVENTION

Embodiment 1

In the present embodiment, explanation will be made about a process in which a security device 1 receives, from a party with legitimate authority via a setting device 2, a registration key Km to be used in the security device's authentication process and encryption process, and the registration key Km is stored in the security device 1. In the following description, it is assumed that an LSI (Large Scale Integration) manufacturer manufactures and sells the security device 1 and an apparatus manufacturer purchases the security device 1.

First, symbols used in the present embodiment 1 will be defined.

(1) Registration Key Km

A registration key Km is a key used in an authentication process, a cryptographic process, etc. performed by the security device, and the registration key Km is set by an LSI manufacturer via a debugging device. The registration key Km is, for example, generated from a key derivation function or the like by using a physical random number. The registration key Km is an object which only an authorized party can set and securely manage.

(2) PUF Key Kpuf

A PUF key Kpuf is a key specific to a security device, which reflects physical differences between individual security devices. The PUF key Kpuf is generated from a value specific to the security device obtained by utilizing a PUF.

(3) Public Key Krp and Secret Key Krs

A public key Krp and a secret key Krs are generated, for example, by using a key derivation algorithm for RSA encryption. These keys are a public key and a secret key of an LSI manufacturer. The secret key Krs is held by the LSI manufacturer and the public key Krp is stored in a nonvolatile memory of the security device.

(4) Encryption Function Enc and Decryption Function Dec

An encryption function Enc and a decryption function Dec respectively are, for example, an encryption function and a decryption function specified in a common key encryption method such as AES (Advanced Encryption Standard). The encryption function, c=Enc (m, k), encrypts an input m with a key k. The decryption function, m=Dec (c, k), decodes an input c with the key k.

(5) Signature Generation Function Sig and Signature Verification Function Veri

A signature generation function Sig and a signature verification function Veri are, for example, functions for generating and verifying an RSA signature or the like. The signature generation function, s=Sig (m, Ks), generates a signature s of an input m using a secret key Ks. The signature verification function, r=Veri ((s| |m), Kp), performs signature verification of an input (s| |m) with a public key Kp and outputs a signature verification result r. Note that A| |B means that A and B are concatenated.

Next, with reference to figures, explanation will be made about a configuration and an operation of the security device according to the present embodiment.

Figure 1:
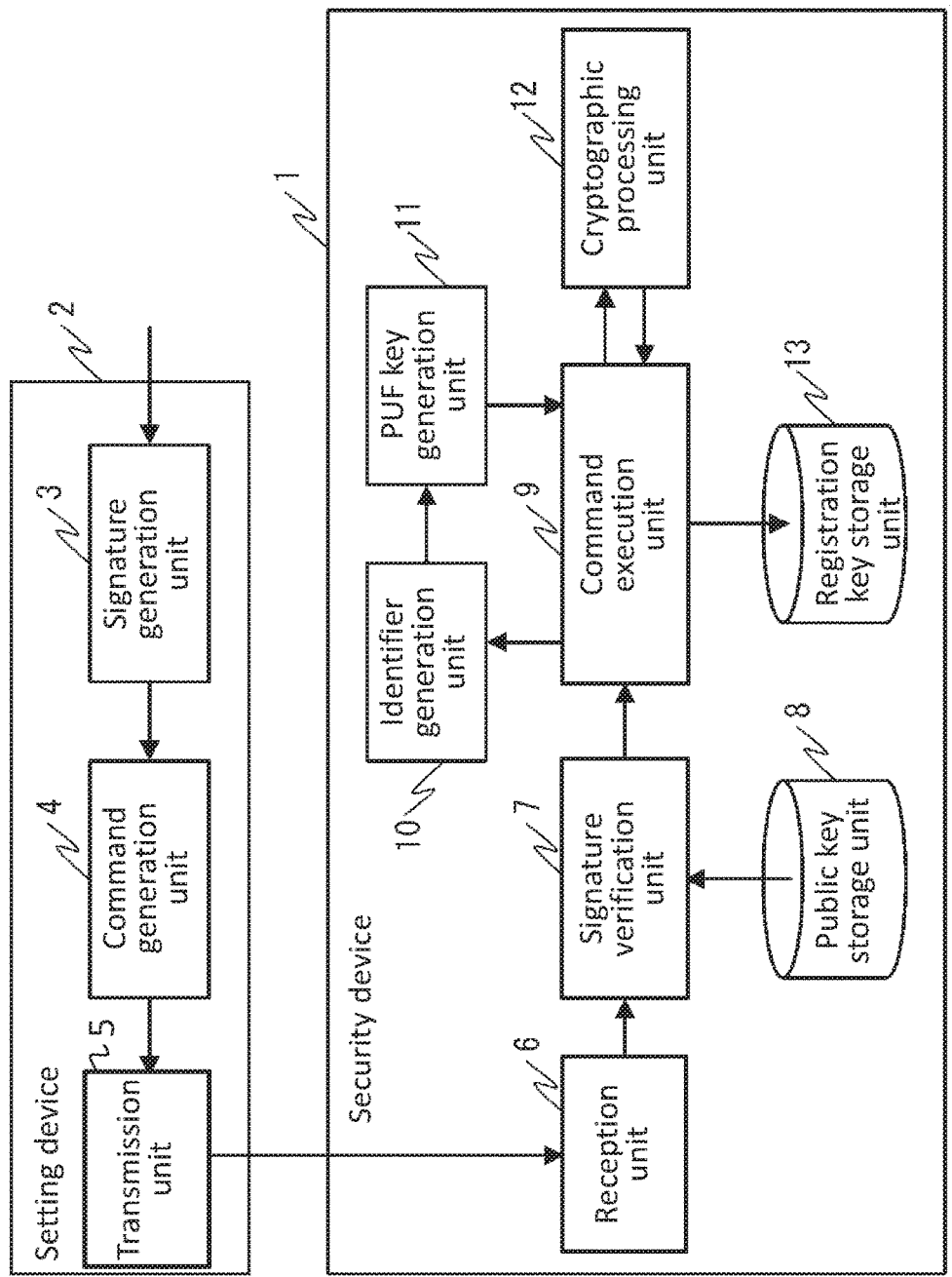
FIG. 1 shows a configuration example of a security device according to Embodiment 1.

FIG. 1 shows a configuration example of the security device according to Embodiment 1.

In FIG. 1, the security device 1 is an IC (integrated circuit) chip; and a setting device 2 performs processes such as those for registering, deleting, and updating keys, and registering the ID of an apparatus to communicate with.

In these processes, access control is performed for impersonation prevention and commands for executing these processes are called privileged commands. In the present embodiment, the processing of the security device will be explained using a key registration processing as an example. Also, a privileged command to perform the key registration processing is called a registration command and a key to be registered is called a registration key.

The setting device 2 includes a signature generation unit 3, a command generation unit 4, and a transmission unit 5. The signature generation unit 3 uses a registration key and a secret key to generate a signature of the registration key. The command generation unit 4 uses the signature and the registration key to generate a registration command. The transmission unit 5 transmits the generated registration command to the security device 1.

The security device 1 includes a reception unit 6, a signature verification unit 7, a public key storage unit 8, a command execution unit 9, an identifier generation unit 10, a PUF key generation unit 11, a cryptographic processing unit 12, and a registration key storage unit 13. The reception unit 6 receives the registration command transmitted from the transmission unit 5 of the setting device 2. The signature verification unit 7 verifies the signature included in the received registration command, using a public key stored in the public key storage unit 8. The command execution unit 9 encrypts the registration key included in the registration command verified by the signature verification unit 7, by using the identifier generation unit 10, the PUF key generation unit 11, and the cryptographic processing unit 12, and then stores the encrypted registration key in the registration key storage unit 13. The identifier generation unit 10 uses a PUF to generate an identifier specific to the device. From the generated identifier, the PUF key generation unit 11 generates a PUF key which is a key specific to the device. The cryptographic processing unit 12 uses the generated PUF key to encrypt the registration key.

Next, explanation will be made about hardware configurations of the security device 1 and the setting device 2.

Figure 2:
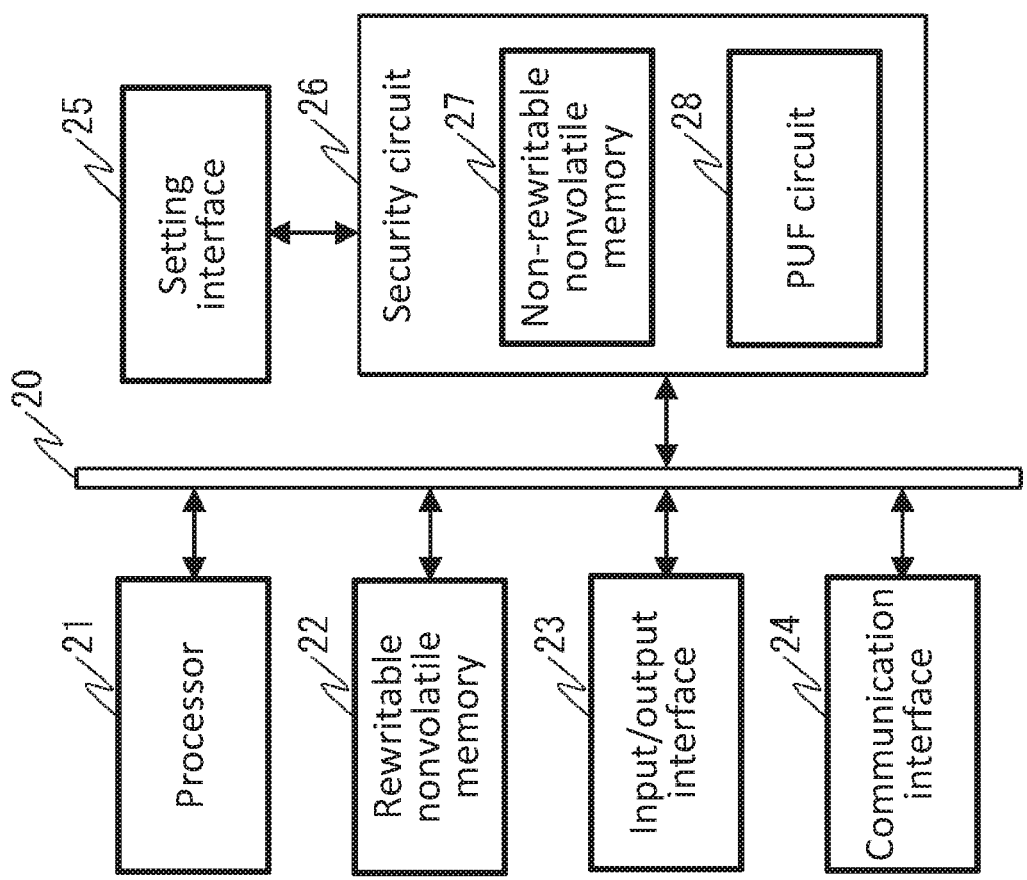
FIG. 2 shows a hardware configuration example of the security device 1.

FIG. 2 shows an example of a hardware configuration of the security device 1.

The security device 1 is an IC chip; and the reception unit 6, the signature verification unit 7, the command execution unit 9, the PUF key generation unit 11, and the cryptographic processing unit 12 of the security device 1 can be realized by a security circuit or a program. The identifier generation unit 10 is realized by a security circuit corresponding to a PUF circuit 28 which will be later described. The security device 1 has a hardware configuration in which a processor 21, a rewritable nonvolatile memory 22, an input/output interface 23, a communication interface 24, a setting interface 25, and a security circuit 26 are connected to a bus 20.

The processor 21 is a central processing unit (CPU) or the like to execute a program.

The rewritable nonvolatile memory 22 is a rewriteable EPROM (Erasable Programmable Read-only Memory); and, for example, a flash-type EEPROM (electrically-Erasable Programmable Read-Only Memory is used. The rewritable nonvolatile memory 22 realizes the registration key storage unit 13 and stores the encrypted registration key Km.

The input/output interface 23 is a device to process input/output data transmitted to and from the security device 1, which is for example an input/output (I/O) board.

The communication interface 24 is an electronic circuit to perform data communication processes, which is for example a communication board.

The setting interface 25 is an interface to directly communicate with the setting device 2 without using the bus 20. For example, the setting interface is a debug interface based on JTAG (Joint Test Action Group) standard.

The security circuit 26 is an electronic circuit in a case where the reception unit 6, the signature verification unit 7, the command execution unit 9, the identifier generation unit 10, the PUF key generation unit 11, and the cryptographic processing unit 12 are each configured with a dedicated circuit. Also, the security circuit 26 includes a non-rewritable nonvolatile memory 27 and a PUF circuit 28.

The non-rewritable nonvolatile memory 27 is a read-only memory (ROM), to which a mask ROM is applicable. The non-rewritable nonvolatile memory 27 realizes the public key storage unit 8 to store the public key Krp.

Normally, a program is stored in the rewritable nonvolatile memory 22 and is read and executed by the processor 21. This program is a program which realizes the functions having been explained as the units configuring the security device 1, namely the reception unit 6, the signature verification unit 7, the command execution unit 9, the PUF key generation unit 11, and the cryptographic processing unit 12.

Figure 3:
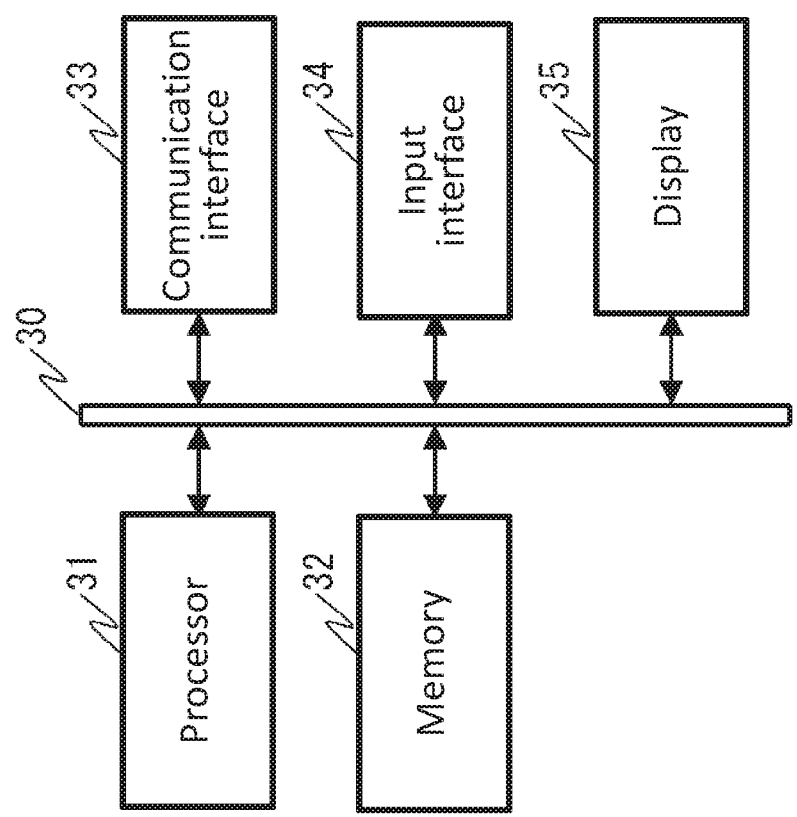
FIG. 3 shows a hardware configuration example of a setting device 2.

FIG. 3 shows an example of the hardware configuration of the setting device 2.

The setting device 2 is a computer and each of the configuration components of the setting device 2 can be realized by a program. The setting device 2 has a hardware configuration in which a processor 31, a memory 32, a communication interface 33, an input interface 34, and a display 35 are connected to a bus 30.

The processor 31 is a central processing unit (CPU) or the like which executes a program.

The memory 32 is a main storage such as a RAM (Random Access Memory), or an external storage device such as a ROM (Read Only Memory), a flash memory, or a hard disk.

The communication interface 33 is an electronic circuit such as a communication board to perform data communication processes.

The input interface 34 is a device such as a touch panel, a hardware key, a mouse, and a keyboard which process data to be inputted to the setting device 2.

The display 35 is a device with which the setting device 2 displays data to be outputted.

Normally, a program is stored in the memory 32, to be read to and executed by the processor 31. This program is a program to realize the functions having been explained as the signature generation unit 3, the command generation unit 4, and the transmission unit 5 which constitute the setting device 2.

Further, an operating system (OS) is stored in the external storage device of the memory 32; at least a portion of the OS is loaded into the main storage and the processor 31 executes the above-mentioned program while executing the OS.

Also, in the following explanation of the embodiment, the memory 32 stores files including information, data, signal values, and variable values which are the processing results of the signature generation unit 3, the command generation unit 4, and the transmission unit 5.

Note that the configurations shown in FIG. 2 and FIG. 3 are only examples of the hardware configurations of the devices. The hardware configurations of the devices are not limited to the configurations shown in FIG. 2 and FIG. 3, and other configurations may be adopted.

Next, the operation flows of the security device 1 and the setting device 2 according to Embodiment 1 will be explained. Here, it is assumed that the security device 1 stores a public key Krp in the public key storage unit 8, and the LSI manufacturer holds a registration key Km and a secret key Krs which corresponds to the public key Krp.

First, commands transmitted from the setting device 2 to the security device 1 will be explained.

Figure 4:
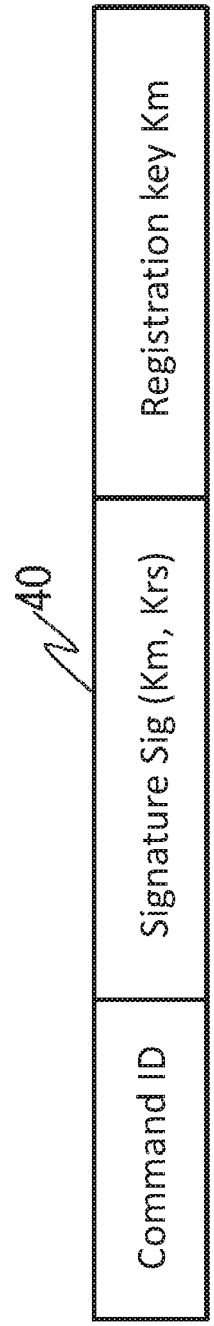
FIG. 4 shows a data format of a secret-information registration request 40, which is an example of commands.

FIG. 4 shows a data format of a secret-information registration request 40 which is an example of commands.

As shown in FIG. 4, the data format of the secret-information registration request 40 includes a command ID, a signature, and a registration key Km. The command ID is an ID uniquely identifying a command transmitted from the setting device 2 to the security device 1. The signature is a signature calculated for the registration key Km. The registration key Km is a key to be registered in the security device 1.

Next, explanation will be made about the operation flow of the setting device 2 according to Embodiment 1.

Figure 5:
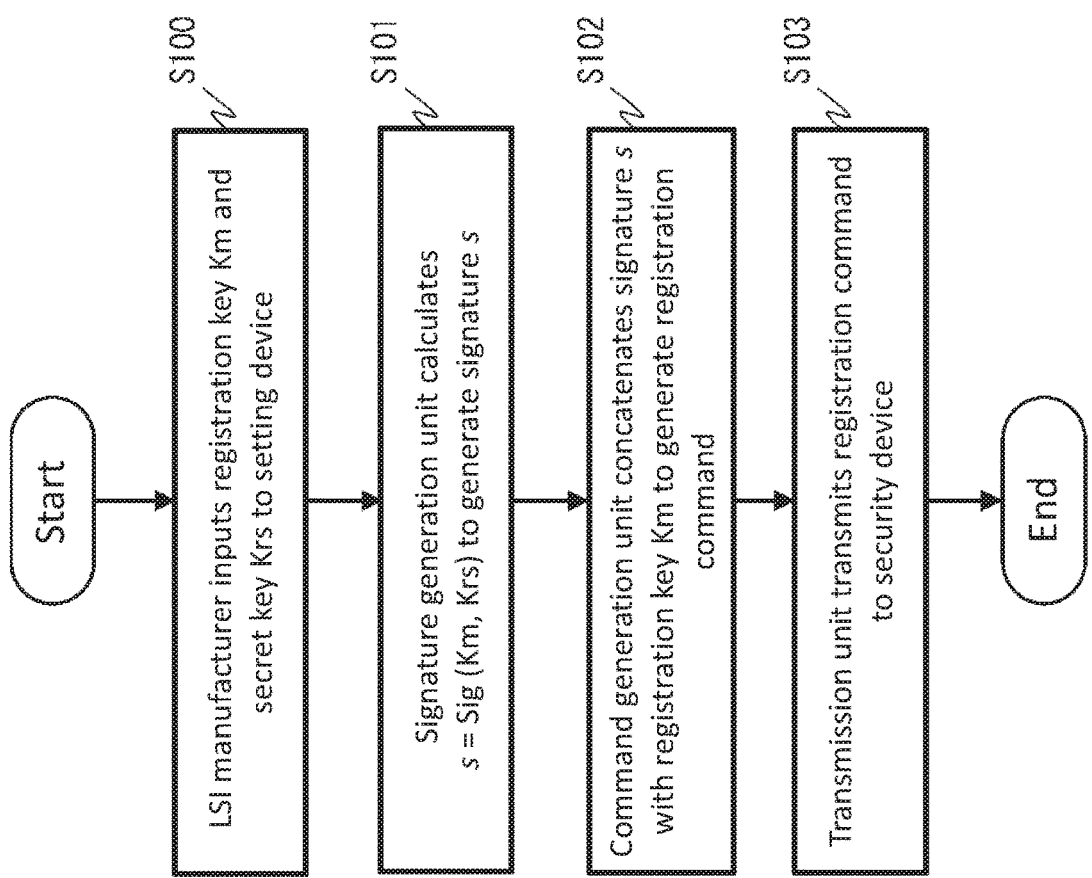
FIG. 5 is a flowchart showing an operation flow of the setting device 2 according to Embodiment 1.

FIG. 5 is a flowchart showing the operation flow of the setting device 2 according to Embodiment 1.

First, in step S100, the LSI manufacturer inputs the registration key Km and the secret key Krs to the setting device 2. Such pieces of information may be inputted to the setting device 2 from its outside, held therein beforehand, or inputted in other ways.

Next, in step S101, the signature generation unit 3 calculates s=Sig (Km, Krs) and generates a signature s of the registration key Km.

Next, in step S102, the command generation unit 4 generates a registration command using (s||Km) produced by concatenating the signature s with the registration key Km.

Next, in step S103, the transmission unit 5 transmits the registration command as a secret-information registration request 40 to the security device 1, and then ends the process.

Figure 6:
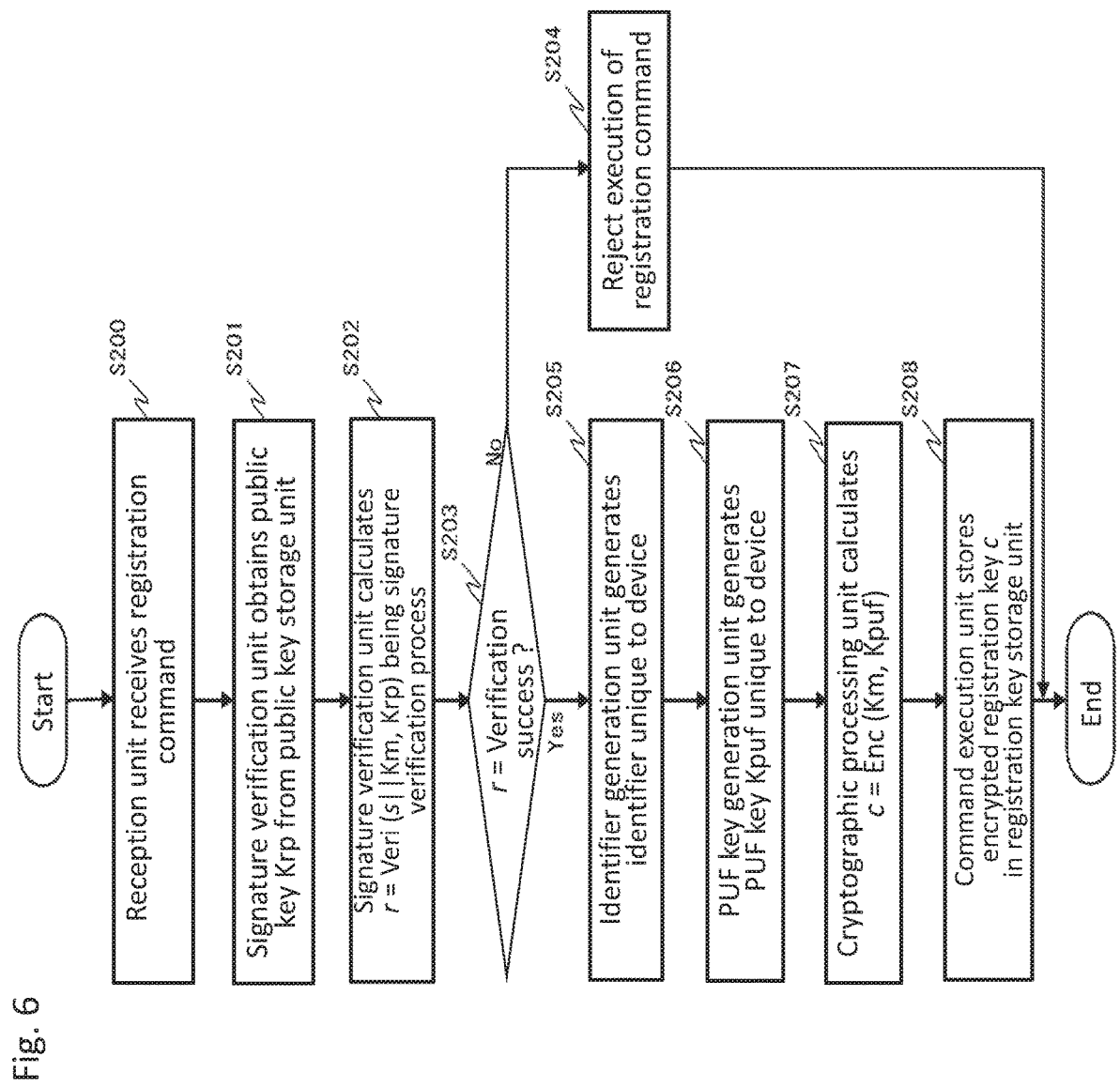
FIG. 6 is a flowchart showing an operation flow of the security device 1 according to Embodiment 1.

Next, explanation will be made about an operation flow of the security device 1 according to Embodiment 1. FIG. 6 is a flowchart showing the operation flow of the security device 1 according to Embodiment 1.

First, in step S200, the reception unit 6 receives the registration command transmitted from the setting device 2.

Next, in step S201, the signature verification unit 7 obtains the public key Krp from the public key storage unit 8.

Next, in step S202, the signature verification unit 7 calculates r=Veri (s∥Km, Krp) being a signature verification process, to verify the validity of the secret-information registration request 40.

Next, in step S203, the signature verification unit 7 checks the signature verification result r. When the signature verification is successful, the signature verification unit 7 inputs the registration key Km to the command execution unit 9 and a "Yes" route is taken to proceed to step S205. On the other hand, when the signature verification is unsuccessful, a "No" route is taken to proceed to step S204 and execution of the registration command is rejected to end the process.

Next, in step S205, the command execution unit 9 requests the identifier generation unit 10 to generate a PUF key Kpuf, and then the identifier generation unit 10 generates an identifier specific to the device.

Next, in step S206, the PUF key generation unit 11 uses the identifier specific to the device generated by the identifier generation unit 10, to generate a PUF key Kpuf specific to the device and then transmit it to the command execution unit 9.

Next, in step S207, the command execution unit 9 having received the PUF key Kpuf inputs the PUF key Kpuf and the registration key Km to the cryptographic processing unit 12 and requests the cryptographic processing unit 12 to perform encryption. The cryptographic processing unit 12 calculates c=Enc (Km, Kpuf) to encrypt the registration key Km with the PUF key Kpuf.

Next, in step S208, the command execution unit 9 stores the encrypted registration key c in the registration key storage unit 13 and ends the process.

As described above, through the processing performed by the setting device 2 and the security device 1, the LSI manufacturer sets the registration key Km to the security device 1.

When performing an authentication process or a cryptographic process in the security device 1, the identifier generation unit 10 and the PUF key generation unit 11 are made generate the PUF key Kpuf, and then the encryption result c of the registration key Km and the PUF key Kpuf are inputted to the cryptographic processing unit 12 to request them to perform a process for decryption. The cryptographic processing unit 12 calculates mk=Dec (c, Kpuf) to decode the registration key Km. Then, the security device 1 uses the decoded registration key Km, to perform a necessary process such as that for encrypting or decrypting.

As described above, in Embodiment 1, a signature is provided to a privileged command such as a key registration and the signature is verified. This brings an effect that without storing the device's ID or PIN in the memory, a third party's unauthorized readout can be prevented, realizing access control to privileged commands.

In the security device 1, only a public key Krp for signature verification and an encryption result c of the registration key Km are stored. Therefore, even when an unauthorized memory readout or the like occurs, information to be obtained is only the public key Krp being public information and the encryption result c having been encrypted, which can prevent information leakage.

Embodiment 2

In Embodiment 1, only a party that has the secret key Krs corresponding to the public key Krp stored in the public key storage unit 8 of the security device 1 can register a registration key Km to the security device 1. This means that when an apparatus manufacturer having purchased the security device 1 wants to register or update the registration key Km, the apparatus manufacturer has to ask the LSI manufacturer to do it or to provide the apparatus manufacturer with the secret key Krs. However, it takes much effort to ask the LSI manufacturer every time when needed, to register or update the registration key Km. It is also difficult for the LSI manufacturer to provide the secret key Krs because they may sell the same security device 1 to other apparatus manufacturers. In Embodiment 2, this problem will be solved by hierarchically managing the keys.

In the beginning, the meanings of symbols newly used in Embodiment 2 will be defined except those defined in Embodiment 1.

(1) Public Key Kmp and Secret Key Kms

A public key Kmp and a secret key Kms are a public key and a secret key, respectively, of an apparatus manufacturer which manufactures an apparatus using an LSI manufactured by an LSI manufacturer. The secret key Kms is held by the apparatus manufacturer and the public key Kmp is held by the LSI manufacturer. In Embodiment 2, the public key is encrypted and stored in the registration key storage unit 13 of the security device 1.

(2) Key Identifier w

The Key identifier w is an identifier which indicates either an apparatus-manufacturer public-key registration request being a command for the LSI manufacturer to request registration of the public key Kmp, or an apparatus-manufacturer secret-information registration request being a command for the apparatus manufacturer to request registration of the registration key Km which is secret information. The security device 1 uses the identifier to choose key information to be read out.

Next, with reference to figures, explanation will be made about a configuration and an operation of the security device according to the present embodiment.

Figure 7:
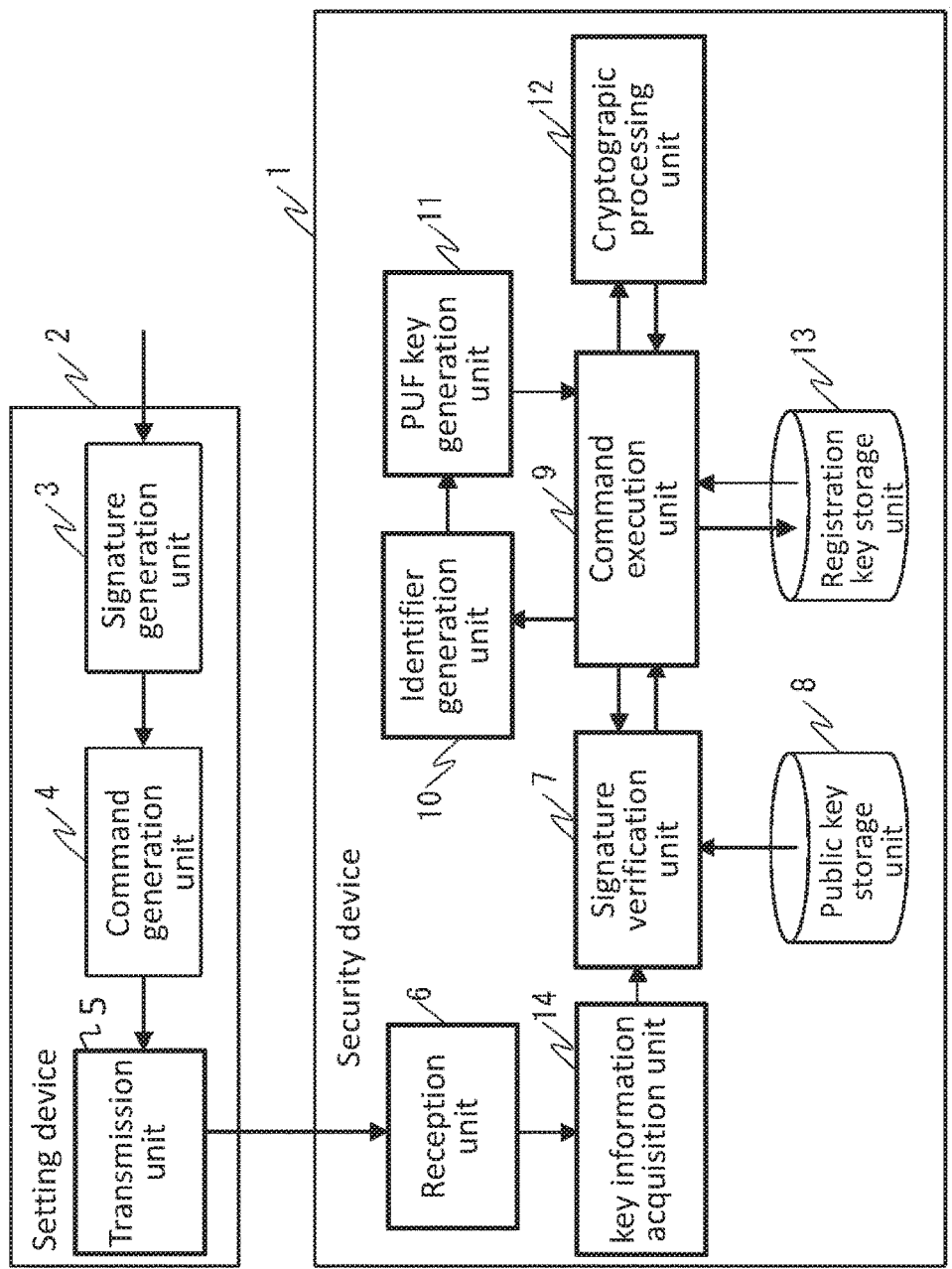
FIG. 7 shows a configuration example of a security device according to Embodiment 2.

FIG. 7 shows a configuration example of the security device according to Embodiment 2.

In FIG. 7, the security device 1 includes a key information acquisition unit 14 in addition to the configuration shown in Embodiment 1. The key information acquisition unit 14 checks a key identifier contained in a registration command transmitted from a setting device 2 and notifies a signature verification unit 7 of key information according to the key identifier. According to the key information notified of by the key information acquisition unit 14, the signature verification unit 7 and a command execution unit 9 obtain a key from the registration key storage unit 13.

The hardware configurations of the security device 1 and the setting device 2 in Embodiment 2 are the same as the configurations shown in FIG. 2 and FIG. 3 of Embodiment 1. The key information acquisition unit 14 can be realized by a security circuit or a program. The program of the key information acquisition unit 14 is stored in the rewritable nonvolatile memory 22.

Next, explanation will be made about operation flows of the security device 1 and the setting device 2 according to Embodiment 2. It is assumed here that an LSI manufacturer holds a secret key Krs for the LSI manufacturer and a public key Kmp for an apparatus manufacturer. Also, the apparatus manufacturer holds a secret key Kms and a registration key Km for the apparatus manufacturer. In Embodiment 2, the LSI manufacturer registers the apparatus manufacturer's public key Kmp in the security device 1, and the apparatus manufacturer registers the registration key Km in the security device 1.

First, explanation will be made about commands transmitted from the setting device 2 to the security device 1.

FIG. 8 shows data formats of command examples: the apparatus manufacturer's public-key registration request 80 and the apparatus manufacturer's secret-information registration request 81.

In FIG. 8, each data format of the apparatus manufacturer's public-key registration request 80 and the apparatus manufacturer's secret-information registration request 81 includes a command ID, a key identifier, and a signature, and also includes either the apparatus manufacturer's public key Kmp or a registration key Km. The key identifier is the key identifier having been described above; for the apparatus manufacturer's public-key registration request 80, the key identifier is w and for the apparatus manufacturer's secret-information registration request 81, the key identifier is w'. The command ID is an ID to uniquely identify a command which the setting device 2 transmits to the security device 1. The signature is a signature calculated for the apparatus manufacturer's public key Kmp or the registration key Km. The apparatus manufacturer's public key Kmp is a key which the LSI manufacturer registers in the security device 1, and the registration key Km is a key which the apparatus manufacturer is going to register in the security device 1.

Next, explanation will be made about an operation (a public key Kmp setting by the LSI manufacturer) flow of the setting device 2 according to Embodiment 2.

Figure 9:
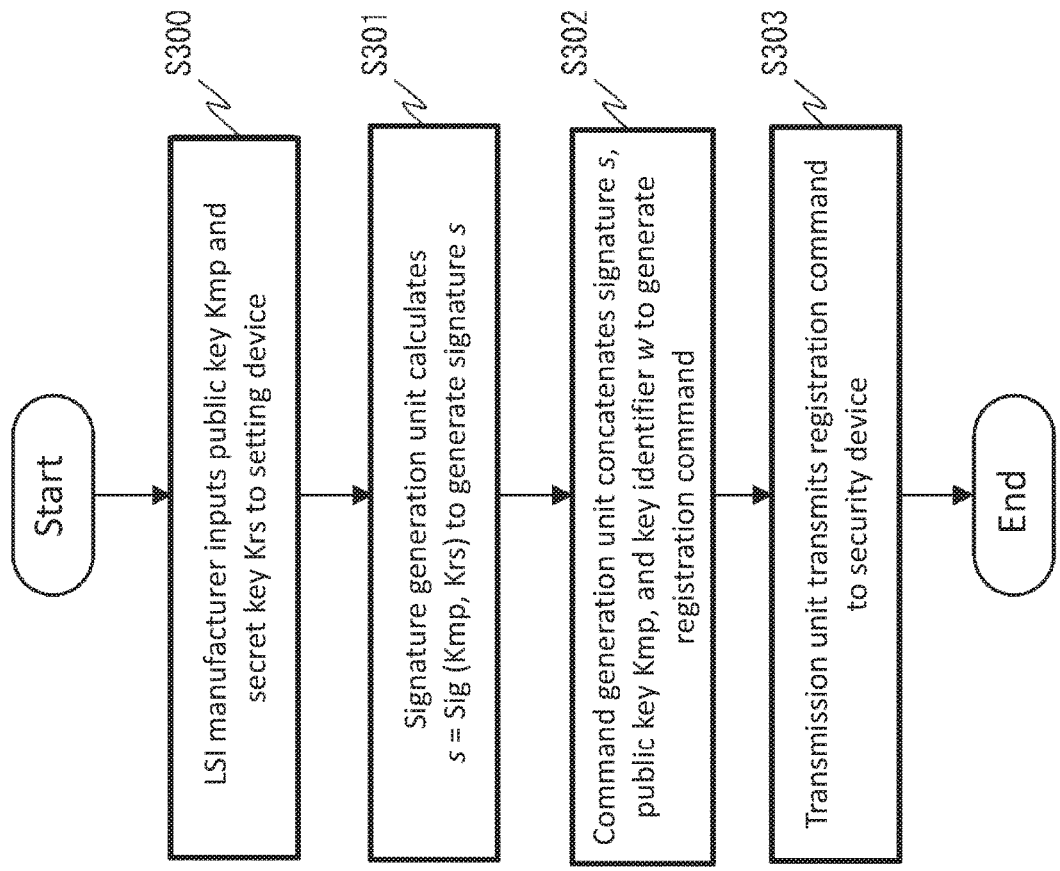
FIG. 9 is a flowchart showing an operation (a public key Kmp setting by an LSI manufacturer) flow of the setting device 2 according to Embodiment 2.

FIG. 9 is a flowchart showing an operation (a public key Kmp setting by the LSI manufacturer) flow of the setting device 2 according to Embodiment 2.

(Public Key Kmp Setting by LSI Manufacturer)

First, in step S300, an LSI manufacturer inputs a public key Kmp and a secret key Krs to the setting device 2. Such pieces of information may be inputted to the setting device 2 from its outside, held therein in advance, or inputted in other ways.

Next, in step S301, the signature generation unit 3 calculates s=Sig (Kmp, Krs) to generate a signature s of the public key Kmp.

Next, in step S302, the command generation unit 4 generates a registration command by using (w| | s| |Kmp) into which the signature s, the public key Kmp, and the identifier w indicating the apparatus manufacturer's public-key registration request are concatenated.

Next, in step S303, the transmission unit 5 transmits the registration command serving as the apparatus manufacturer's public-key registration request 80, to the security device 1, and then ends the process.

Next, explanation will be made about an operation (a public key Kmp setting by the LSI manufacturer) flow of the security device 1 according to Embodiment 2.

Figure 10:
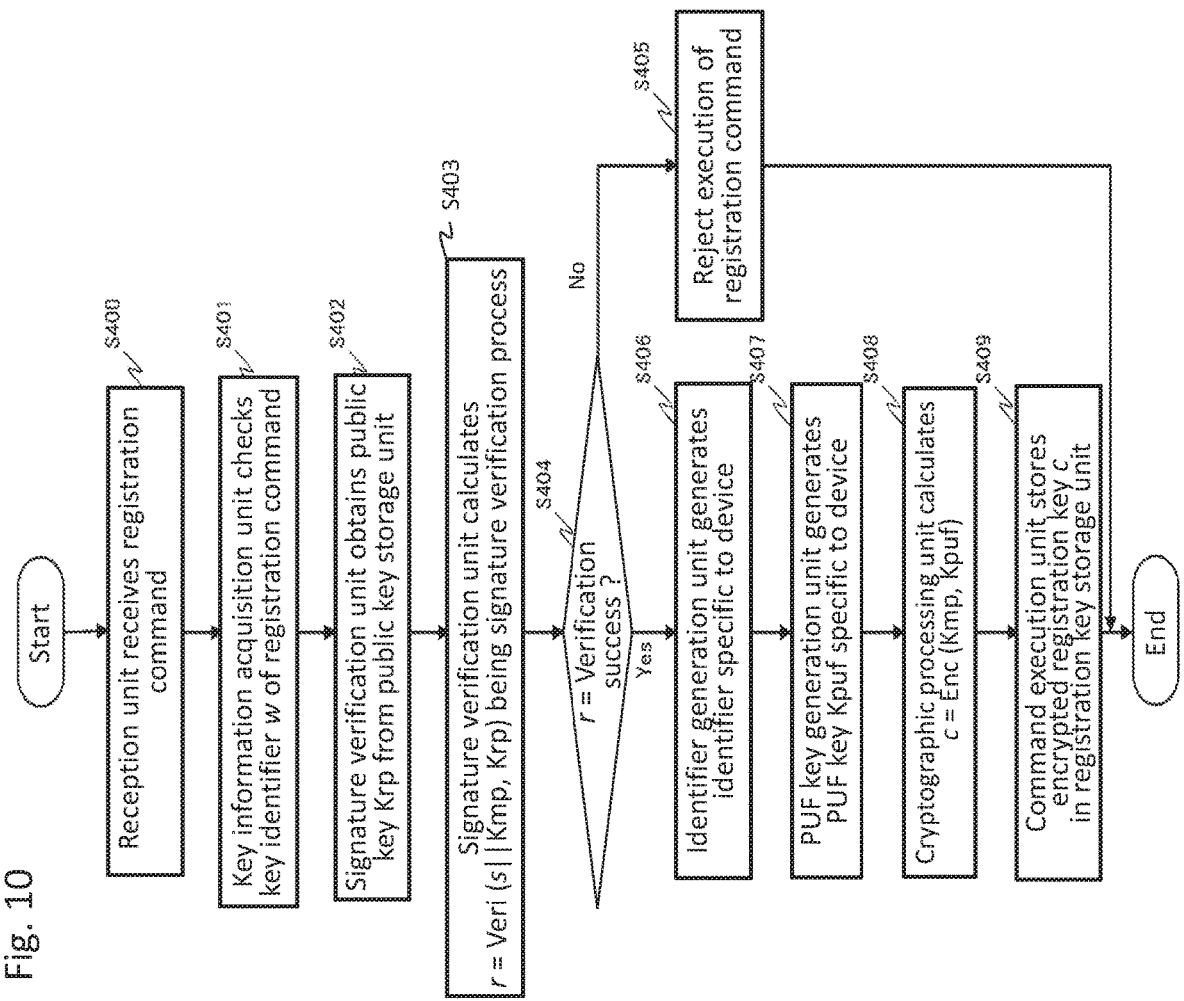
FIG. 10 is a flowchart showing an operation (the public key Kmp setting by the LSI manufacturer) flow of the security device 1 according to Embodiment 2.

FIG. 10 is a flowchart showing the operation (the public key Kmp setting by the LSI manufacturer) flow of the security device 1 according to Embodiment 2.

First, in step S400, the reception unit 6 receives a registration command transmitted from the setting device 2.

Next, in step S401, the key information acquisition unit 14 checks the key identifier w of the registration command and confirms that the registration command is for the apparatus manufacturer's public-key registration request 80. The key information acquisition unit 14 notifies the signature verification unit 7 that the registration command is for the apparatus manufacturer's public-key registration request 80.

Next, in step S402, the signature verification unit 7 obtains the public key Krp from the public key storage unit 8.

Next, in step S403, the signature verification unit 7 calculates r=Veri (s| |Kmp, Krp) being the signature verification process, and verifies the validity of the apparatus manufacturer's public-key registration request 80.

Next, in step S404, the signature verification unit 7 checks the signature verification result r. When the signature verification is successful, the signature verification unit 7 notifies the command execution unit 9 that the registration command is for the apparatus manufacturer's public-key registration request 80, inputs the public key Kmp to the command execution unit 9, and then takes a "Yes" route to proceed to step S406.

On the other hand, when the signature verification is unsuccessful, the signature verification unit 7 takes a "No" route to proceed to step S405 and rejects execution of the registration command to end the process.

Next, in step S406, the command execution unit 9 requests the identifier generation unit 10 to generate a PUF key Kpuf and the identifier generation unit 10 generates an identifier specific to the device.

Next, in step S407, the PUF key generation unit 11 generates the PUF key Kpuf specific to the device using the identifier specific to the device generated by the identifier generation unit 10, and transmits the PUF key Kpuf to the command execution unit 9.

Next, in step S408, the command execution unit 9 having obtained the PUF key Kpuf inputs the PUF key Kpuf and the public key Kmp to the cryptographic processing unit 12 and requests to perform encryption. The cryptographic processing unit 12 calculates c=Enc (Kmp, Kpuf) to encrypt the public key Kmp with the PUF key Kpuf.

Next, in step S409, the command execution unit 9 stores the encrypted registration key c in the registration key storage unit 13 to end the process.

As described above, through the processing performed by the setting device 2 and the security device 1, the LSI manufacturer sets the public key Kmp to the security device 1.

Next, explanation will be made about an operation (a registration key Km setting by an apparatus manufacturer) flow of the setting device 2 according to Embodiment 2.

Figure 11:
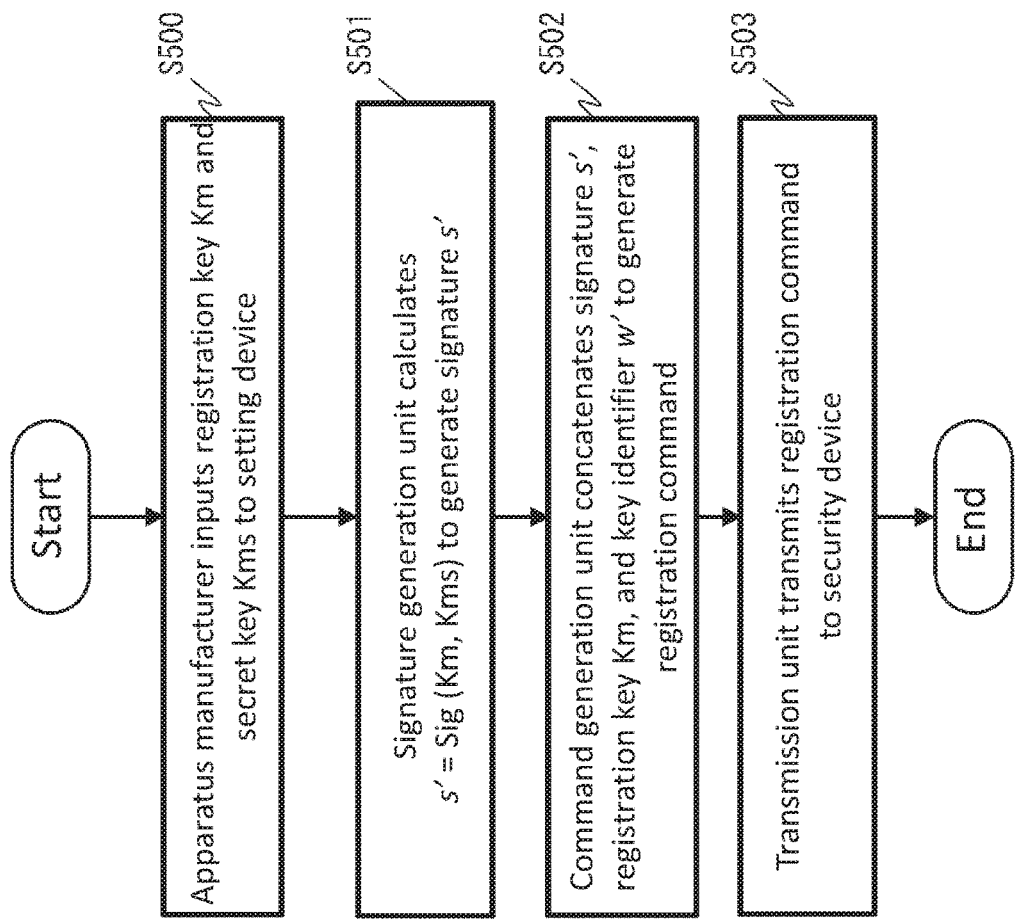
FIG. 11 is a flowchart showing an operation (a registration key Km setting by an apparatus manufacturer) flow of the setting device 2 according to Embodiment 2.

FIG. 11 is a flowchart showing the operation (the registration key Km setting by the apparatus manufacturer) flow of the setting device 2 according to Embodiment 2.

(Registration Key Km Setting by Apparatus Manufacturer)

First, in step S500, an apparatus manufacturer inputs a registration key Km and a secret key Kms to the setting device 2. Such pieces of information may be inputted to the setting device 2 from its outside, held therein in advance, or inputted in other ways.

Next, in step S501, the signature generation unit 3 calculates s'=Sig (Km, Kms) to generate the signature s' of the registration key Km.

Next, in step S502, the command generation unit 4 generates a registration command by using (w'| |s'| |Km) into which the signature s', the registration key Km, and the identifier w' indicating the apparatus manufacturer's secret-information registration request 81 are concatenated.

Next, in step S503, the transmission unit 5 transmits the registration command serving as the apparatus manufacturer's secret-information registration request 81, to the security device 1 and ends the process.

Next, explanation will be made about an operation (a registration key Km setting by the apparatus manufacturer) flow of the security device 1 according to Embodiment 2.

Figure 12:
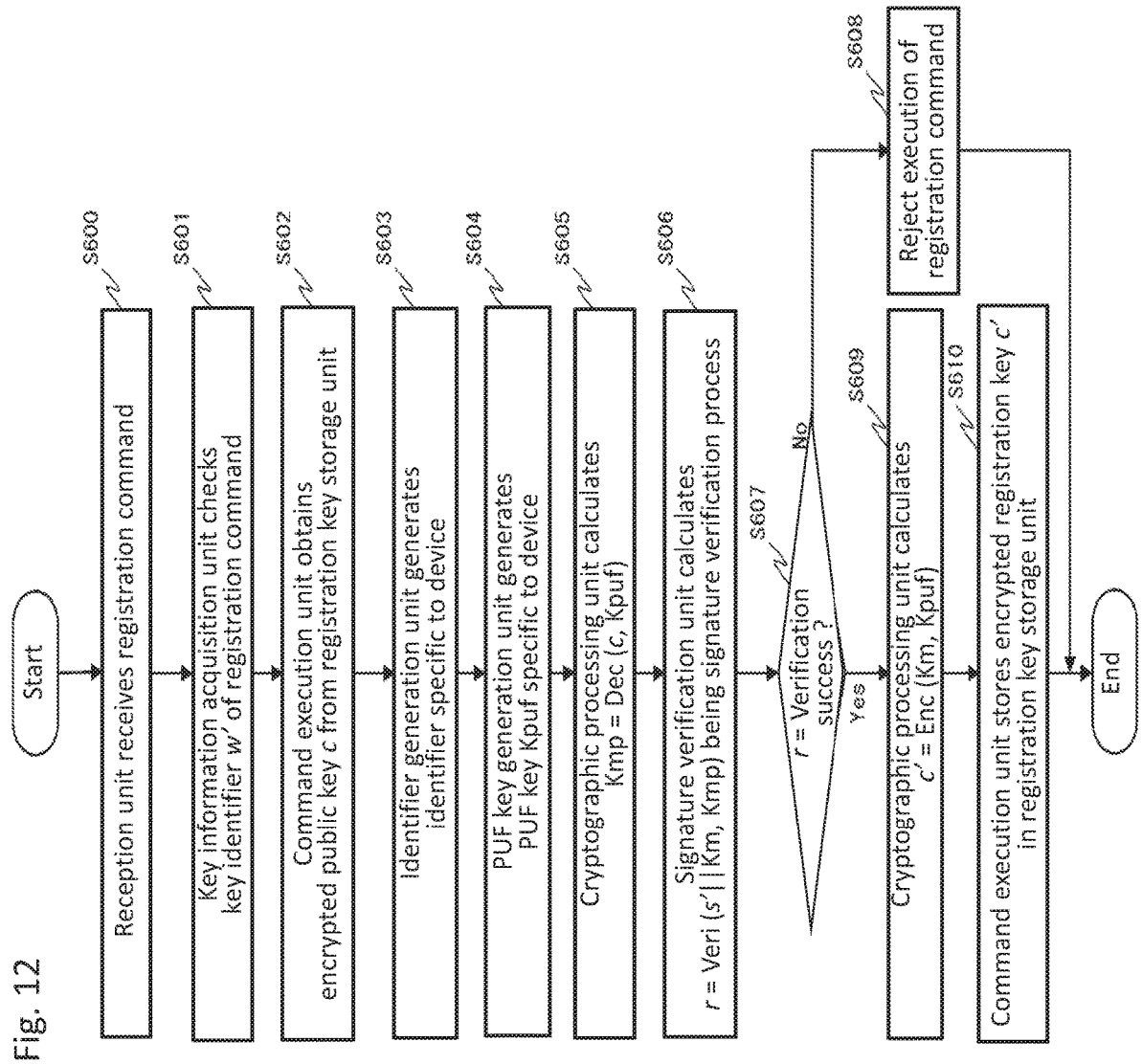
FIG. 12 is a flowchart showing an operation (the registration key Km setting by the apparatus manufacturer) flow of the security device 1 according to Embodiment 2.

FIG. 12 is a flowchart showing the operation (the registration key Km setting by the apparatus manufacturer) flow of the security device 1 according to Embodiment 2.

First, in step S600, the reception unit 6 receives a registration command transmitted from the setting device 2.

Next, in step S601, the key information acquisition unit 14 checks the key identifier w' of the registration command and confirms that the registration command is for the apparatus manufacturer's secret-information registration request 81. The key information acquisition unit 14 notifies the signature verification unit 7 that the registration command is for the apparatus manufacturer's secret-information registration request 81.

Next, in step S602, the signature verification unit 7 notifies the command execution unit 9 that the registration command is for the apparatus manufacturer's secret-information registration request 81, and the command execution unit 9 obtains the encrypted public key c from the registration key storage unit 13.

Next, in step S603, the command execution unit 9 requests the identifier generation unit 10 to generate a PUF key Kpuf, and the identifier generation unit 10 generates an identifier specific to the device.

Next, in step S604, the PUF key generation unit 11 generates the PUF key Kpuf specific to the device, using the identifier specific to the device generated by the identifier generation unit 10, and transmits the PUF key Kpuf to the command execution unit 9.

Next, in step S605, the command execution unit 9 having obtained the PUF key Kpuf inputs the PUF key Kpuf and the encrypted public key c to the cryptographic processing unit 12 to request to perform decryption, and the cryptographic processing unit 12 calculates Kmp=Dec (c, Kpuf) to decode the encrypted public key c to obtain a public key Kmp. Then, the cryptographic processing unit 12 inputs the public key Kmp to the command execution unit 9, and the command execution unit 9 inputs the public key Kmp and a key (s'∥Km) concatenated with the signature, to the signature verification unit 7.

Next, in step S606, the signature verification unit 7 calculates r=Veri (s'∥Km, Kmp) being the signature verification process, to verify the validity of the apparatus manufacturer's secret-information registration request 81.

Next, in step S607, the signature verification unit 7 checks the signature verification result r. When the signature verification is successful, the signature verification unit 7 notifies the command execution unit 9 that the registration command is for the apparatus manufacturer's secret-information registration request 81, inputs the registration key Km to the command execution unit 9, and takes a "Yes" route to proceed to step S609. On the other hand, when the signature verification is unsuccessful, the signature verification unit 7 takes a "No" route to proceed to step S608 and rejects execution of the registration command to end the process.

Next, in step S609, the command execution unit 9 inputs the PUF key Kpuf and the registration key Km to the cryptographic processing unit 12 to request to perform encryption, and the cryptographic processing unit 12 calculates c'=Enc (Km, Kpuf) to encrypt the registration key Km with the PUF key Kpuf.

Next, in step S610, the command execution unit 9 stores the encrypted registration key c' in the registration key storage unit 13, and ends the process.

As described above, through the processing performed by the setting device 2 and the security device 1, the apparatus manufacturer sets the registration key Km to the security device 1.

As described above, in the present embodiment 2, an LSI manufacturer changes a security device's public key set according to each of apparatus manufacturers, to sell the security device; and the apparatus manufacturer uses the public key uniquely assigned to the manufacturer to register, on its own, a registration key which the apparatus manufacturer wishes to register. This brings about an effect that the apparatus manufacturer can freely register the registration key.

DESCRIPTION OF SYMBOLS

1: security device
2: setting device
3: signature generation unit
4: command generation unit
5: transmission unit
6: reception unit
7: signature verification unit
8: public key storage unit
9: command execution unit
10: identifier generation unit
11: PUF key generation unit
12: cryptographic processing unit
13: registration key storage unit
14: key information acquisition unit
20, 30: bus
21, 31: processor
22: rewritable nonvolatile memory
23: input/output interface
24, 33: communication interface
25: setting interface
26: security circuit
27: non-rewritable nonvolatile memory
28: PUF circuit
34: input interface
35: display
32: memory
40: secret-information registration request
80: apparatus manufacturer's public-key registration request
81: apparatus manufacturer's secret-information registration request

The invention claimed is:
1. A security device comprising:
a public key storage which is a non-rewritable memory to store a first public key associated with a manufacturer of the security device;
an identifier generation circuit to generate an identifier specific to the security device by using a PUF (physical unclonable function);
a PUF key generation circuit to generate a PUF key specific to the security device by using the identifier;
a registration key storage to store a registration key;
a receiver to receive, from a setting device, a registration command in which the registration key has been concatenated with a signature generated for the registration key by using a secret key corresponding to the first public key;
a signature verification circuit to verify, using the first public key, validity of the signature and the registration key contained in the registration command received by the receiver and output the verification result indicating either failure or success in the verification; and
a command execution circuit to
reject, in a case where the verification result outputted from the signature verifier is failure, execution of the registration command; and
in a case where the verification result is success, to generate, using the identifier generation circuit, an identifier specific to the security device using a physical unclonable function;
generate, using the PUF key generation circuit, a PUF key specific to the security device using the generated identifier;
encrypt the registration key received with the registration command with the generated PUF key; and
store the encrypted registration key in the registration key storage of the security device.

2. A system for verification of a registration keys for security devices, the system comprising:
a setting device comprising
a signature generation circuit to generate a signature of a registration key received from a manufacturer of a security device by using a secret key of the manufacturer of the security device,
a command generation circuit to generate a registration command in which the generated signature and the registration key are concatenated, and
a transmitter to transmit the registration command to a security device; and a security device comprising
a public key storage which is a non-rewritable memory to store a first public key associated with a manufacturer of the security device;
an identifier generation circuit to generate an identifier specific to the security device by using a PUF (physical unclonable function);
a PUF key generation circuit to generate a PUF key specific to the security device by using the identifier;
a registration key storage to store a registration key;
a receiver to receive, from the setting device, a registration command in which a registration key has been concatenated with a signature generated for the registration key using a secret key corresponding to the first public key;
a signature verification circuit to verify, using the first public key, validity of the signature and the registration key contained in the registration command received by the receiver and output the verification result indicating either failure or success in the verification; and
a command execution circuit to
reject, in a case where the verification result outputted from the signature verifier is failure, execution of the registration command; and
in a case where the verification result is success, to generate, using the identifier generation circuit, an identifier specific to the security device using a physical unclonable function;
generate, using the PUF key generation circuit, a PUF key specific to the security device using the generated identifier;
encrypt the registration key received with the registration command with the generated PUF key; and
store the encrypted registration key in the registration key storage of the security device.

3. The system according to claim 2, wherein
the command generation circuit in the setter generates a registration command which contains a key identifier indicating a command type to request to register either a second public key or the registration key;
the security device further comprises a key information acquisition circuit to notify the signature verification circuit of the command type indicated by the key identification circuit contained in the registration command; and
in a case where a verification result of the signature contained in the registration command is success, the signature verification circuit notifies the command execution circuit of the command type indicated by the key identifier, and the command execution circuit encrypts the second public key or the registration key in accordance with the command type and stores the encrypted second public key or the encrypted registration key in the registration key storage.

4. A security method for a security device which includes a first memory being non-rewritable to store a public key associated with a manufacturer of the security device and a second memory being rewritable to store a registration key and which encrypts the registration key to be stored in the second memory, the security method comprising:
receiving, from a setting device, a registration command in which the registration key has been concatenated with a signature generated for the registration key using a secret key corresponding to the public key;
verifying, using the public key, validity of the signature and the registration key contained in the registration command received and outputting the verification result indicating either failure or success in the verification;
rejecting execution of the registration command in a case where the verification result is failure; and
in a case where the verification result is a success
generating an identifier specific to the security device using a physical unclonable function (PUF),
generating a PUF key specific to the security device using the generated identifier,
encrypting the registration key received with the registration command with the generated PUF key, and
storing the encrypted registration key in the second memory of the security device.

* * * * *